(12) United States Patent
Sokolov et al.

(10) Patent No.: US 10,375,077 B1
(45) Date of Patent: Aug. 6, 2019

(54) SYSTEMS AND METHODS FOR MEDIATING INFORMATION REQUESTS

(71) Applicant: Symantec Corporation, Mountain View, CA (US)

(72) Inventors: Ilya Sokolov, Boston, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 259 days.

(21) Appl. No.: 15/235,900

(22) Filed: Aug. 12, 2016

(51) Int. Cl.
  *G06F 21/62* (2013.01)
  *H04L 29/06* (2006.01)
  *H04L 29/08* (2006.01)
  *H04B 1/3827* (2015.01)

(52) U.S. Cl.
  CPC ........ *H04L 63/101* (2013.01); *G06F 21/6245* (2013.01); *H04B 1/3827* (2013.01); *H04L 63/08* (2013.01); *H04L 67/32* (2013.01)

(58) Field of Classification Search
  CPC ..... H04L 63/00; H04L 63/08; H04L 63/0823; H04L 63/10; H04L 63/101; H04L 63/107; G06F 21/60; G06F 21/62; G06F 21/6245
  See application file for complete search history.

(56) References Cited

U.S. PATENT DOCUMENTS

| | | | | |
|---|---|---|---|---|
| 6,510,236 B1* | 1/2003 | Crane | ............ | G06F 21/32 382/116 |
| 8,429,709 B2* | 4/2013 | Brodie | ............ | G06F 21/6227 707/694 |
| 8,429,710 B1* | 4/2013 | Schepis | ............ | G06Q 30/06 707/705 |
| 2007/0298720 A1* | 12/2007 | Wolman | ............ | H04L 63/1408 455/66.1 |
| 2009/0298514 A1* | 12/2009 | Ullah | ............ | G01S 5/02 455/456.5 |
| 2010/0024042 A1* | 1/2010 | Motahari | ............ | G06F 21/577 726/26 |
| 2012/0078737 A1* | 3/2012 | Kulakowski | ............ | G06Q 20/20 705/16 |
| 2012/0173554 A1* | 7/2012 | Hinton | ............ | G06F 21/6218 707/754 |
| 2012/0178419 A1* | 7/2012 | Facemire | ............ | H04L 63/0492 455/411 |

(Continued)

OTHER PUBLICATIONS

ShoCard; https://shocard.com/; May 2015.

*Primary Examiner* — Eric W Shepperd
(74) *Attorney, Agent, or Firm* — FisherBroyles, LLP

(57) ABSTRACT

The disclosed computer-implemented method for mediating information requests may include (1) detecting, at the information-managing device, a request for the information-managing device to provide at least one element of personal information to a requesting device that is within physical proximity of the information-managing device, (2) evaluating, based at least in part on an attribute of the request, whether the request for the element of personal information is appropriate, and (3) performing a security action that responds to the request in a manner that is commensurate to the appropriateness of the request for the element of personal information. Various other methods, systems, and computer-readable media are also disclosed.

18 Claims, 7 Drawing Sheets

(56) References Cited

U.S. PATENT DOCUMENTS

| | | | | |
|---|---|---|---|---|
| 2012/0218075 A1* | 8/2012 | Hill | ............... | G07C 9/00103 |
| | | | | 340/5.61 |
| 2013/0061291 A1* | 3/2013 | Hegg | ............... | G06F 21/33 |
| | | | | 726/4 |
| 2014/0337997 A1* | 11/2014 | Beck | ............... | G06F 21/60 |
| | | | | 726/27 |
| 2014/0368336 A1* | 12/2014 | Felix | ............... | H04W 4/90 |
| | | | | 340/539.13 |
| 2016/0104008 A1* | 4/2016 | Lacey | ............... | G06F 21/6263 |
| | | | | 726/28 |
| 2017/0187748 A1* | 6/2017 | Durand | ............... | H04L 63/1475 |
| 2017/0230369 A1* | 8/2017 | Chanda | ............... | H04L 63/10 |
| 2018/0077172 A1* | 3/2018 | Ardeli | ............... | H04L 63/1408 |

* cited by examiner

SYSTEMS AND METHODS FOR MEDIATING INFORMATION REQUESTS

BACKGROUND

Companies are increasingly using automated kiosks, vending machines, and the like to provide customers with access to various services. In addition, payment processors are increasingly using systems that allow customers to pay charges using a mobile phone. All of these systems may request various elements of personal information from customers and/or users. For example, a kiosk may request a user's age, gender, and stated preferences to guide them to appropriate products and/or content.

However, some systems may request more information than is strictly necessary to complete a transaction. Furthermore, malicious individuals may compromise and/or spoof various requesting systems in an effort to steal information from users. The instant disclosure therefore identifies and addresses a need for improved systems and methods to mediate information requests.

SUMMARY

As will be described in greater detail below, the instant disclosure describes various systems and methods for mediating information requests. In one example, a computer-implemented method for mediating information requests may include (i) detecting, at the information-managing device, a request for the information-managing device to provide at least one element of personal information to a requesting device that is within physical proximity of the information-managing device, (ii) evaluating, based at least in part on at least one attribute of the request, whether the request for the element of personal information is appropriate, and (iii) performing a security action that responds to the request in a manner that is commensurate to the appropriateness of the request for the element of personal information. The information-managing device may include (i) a mobile device, (ii) a smart phone, and/or (iii) a smart badge. Additionally, the computer-implemented method may further include, prior to responding to the request, providing a user of the information-managing device with a security challenge that verifies the identity of the user.

In some examples, evaluating whether the request for the element of personal information is appropriate may include determining whether the request exceeds user-privacy preferences specified by a user of the information-managing device. Additionally or alternatively, evaluating whether the request for the element of personal information is appropriate may include determining whether the requesting device is listed on a whitelist that identifies approved requesting devices and/or a blacklist that identifies disapproved requesting devices.

In some embodiments, the attribute of the request may include a variety of attributes, such as (i) a time of day when the request was received, (ii) the physical location of the requesting device, (iii) a device type of the requesting device, (iv) a manufacturer of the requesting device, (v) a unique identifier associated with the requesting device, (vi) a reputation score associated with the requesting device, (vii) a third-party verification certificate, included within the request, that digitally verifies the identity of the requesting device by a third party, and/or (viii) at least one characteristic of the element of personal information specified in the request.

The reputation score may be calculated based on a number of factors, such as prior requests issued by the requesting device and/or prior requests issued by other requesting devices. This reputation score may be calculated by a third-party security vendor and/or the information-managing device.

In some embodiments, performing the security action in a manner that is commensurate to the appropriateness of the request for the element of personal information may include, in response to determining that at least a portion of the request is inappropriate, preventing the information-managing device from providing the element of personal information to the requesting device and/or, in response to determining that at least a portion of the request is appropriate, providing the element of personal information to the requesting device. In such embodiments, preventing the information-managing device from providing the element of personal information may include providing a partial response to the requesting device.

Additionally or alternatively, the security action further may include (i) notifying a user of the information-managing device of the request, (ii) providing a security vendor with a report that contains details about the request, and/or (iii) generating a log entry that describes the request.

In one embodiment, a software system for implementing the above-described method may include (i) a detecting module, stored in memory, that detects, at an information-managing device, a request for the information-managing device to provide at least one element of personal information to a requesting device that is within physical proximity of the information-managing device, (ii) an evaluating module, stored in memory, that evaluates, based at least in part on at least one attribute of the request, whether the request for the element of personal information is appropriate, (iii) a performing module, stored in memory, that performs a security action that responds to the request in a manner that is commensurate to the appropriateness of the request for the element of personal information, and (iv) at least one physical processor configured to execute the detecting module, the evaluating module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, at the information-managing device, a request for the information-managing device to provide at least one element of personal information to a requesting device that is within physical proximity of the information-managing device, (ii) evaluate, based at least in part on at least one attribute of the request, whether the request for the element of personal information is appropriate, and (iii) perform a security action that responds to the request in a manner that is commensurate to the appropriateness of the request for the element of personal information.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
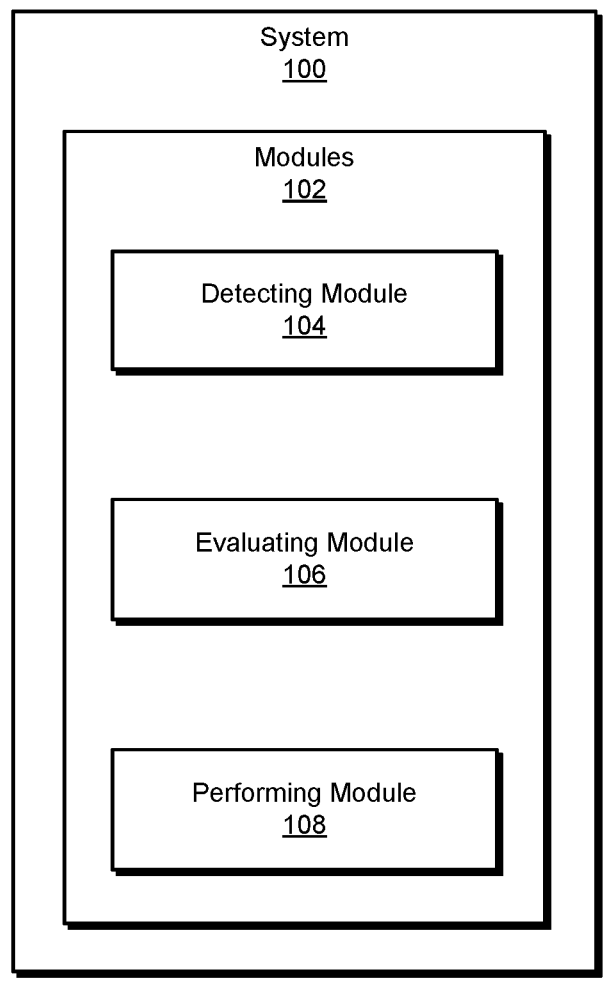
FIG. 1 is a block diagram of an example system for mediating information requests.

Throughout the drawings, identical reference characters and descriptions indicate similar, but not necessarily identical, elements. While the embodiments described herein are susceptible to various modifications and alternative forms, specific embodiments have been shown by way of example in the drawings and will be described in detail herein. However, the embodiments described herein are not intended to be limited to the particular forms disclosed. Rather, the instant disclosure covers all modifications, equivalents, and alternatives falling within the scope of the appended claims.

DETAILED DESCRIPTION OF EMBODIMENTS

The present disclosure is generally directed to systems and methods for mediating information requests. As will be explained in greater detail below, the systems and methods described herein may evaluate whether a request for personal information is legitimate. The disclosed systems and methods may thereby allow users to configure their personal devices to prevent services from receiving more personal information than is necessary to complete a transaction. Furthermore, certain embodiments may allow a backend system to collect and analyze information requests from a number of devices, and use this data to calculate reputation scores and/or appropriateness heuristics for a variety of requesting devices, thus allowing individual devices to expose themselves to minimal risk when interacting with a new requesting device.

As such, the disclosed systems and methods may improve the functioning of various information-managing devices by enabling these devices to accurately assess whether a request for personal information is appropriate or not. These systems and methods may also improve the field of mobile device security by allowing users to tailor the circumstances under which they provide specific elements of personal information to vending machines, service kiosks, and the like.

Figure 2:
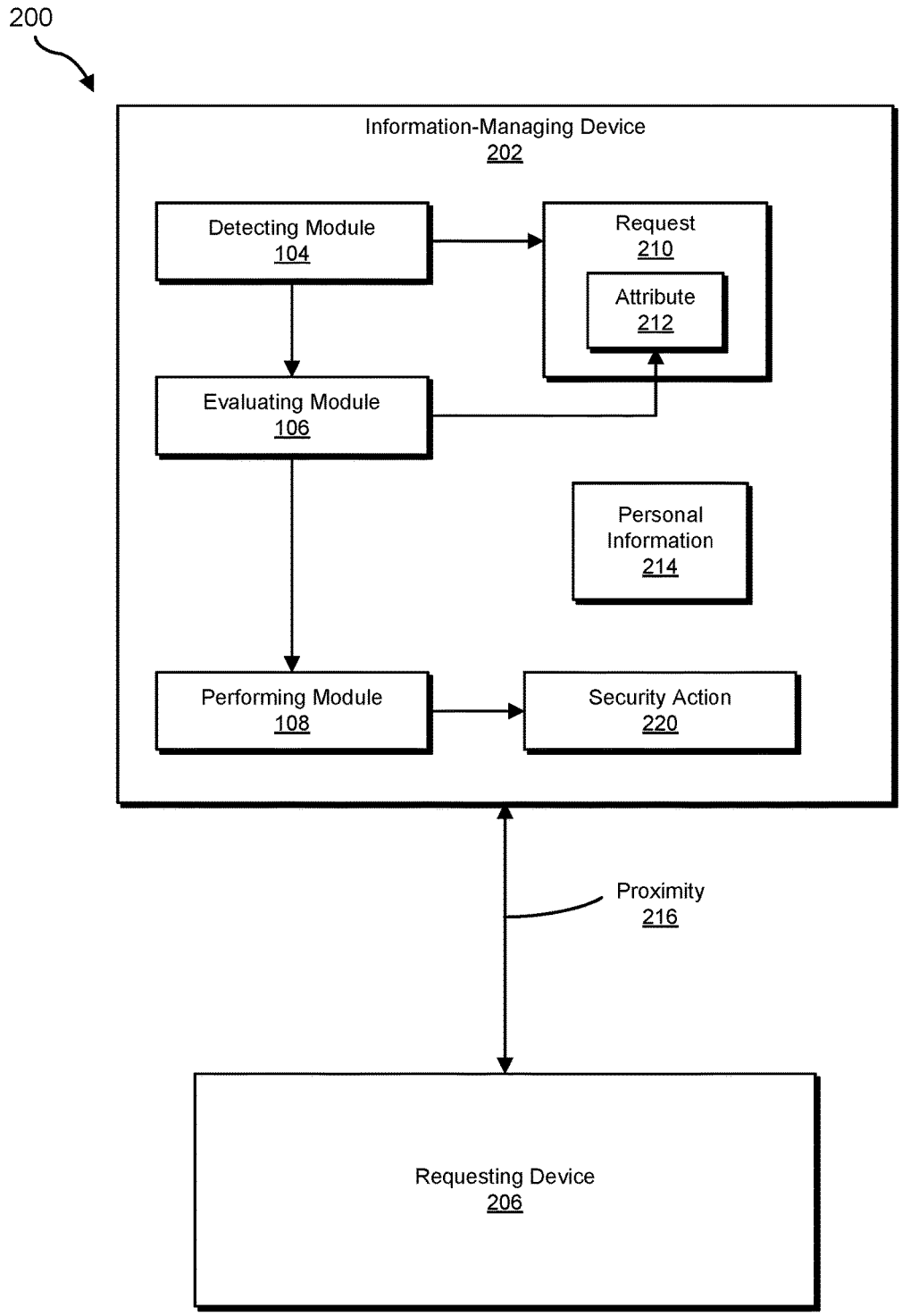
FIG. 2 is a block diagram of an additional example system for mediating information requests.

The following will provide, with reference to FIGS. 1-2, detailed descriptions of various systems for mediating information requests. Detailed descriptions of corresponding computer-implemented methods will also be provided in connection with FIG. 3. Additional detailed descriptions of systems for mediating information requests will be provided in connection with FIG. 4, and detailed descriptions of an example decision flow will be provided in connection with FIG. 5. Furthermore, detailed descriptions of an example computing system and network architecture capable of implementing one or more of the embodiments described herein will be provided in connection with FIGS. 6 and 7, respectively.

FIG. 1 is a block diagram of a system 100 for mediating information requests. As illustrated in this figure, system 100 may include one or more modules 102 for performing one or more tasks. For example, and as will be explained in greater detail below, system 100 may include a detecting module 104 that detects, at an information-managing device, a request for the information-managing device to provide at least one element of personal information to a requesting device that is within physical proximity of the information-managing device. System 100 may additionally include an evaluating module 106 that evaluates, based at least in part on at least one attribute of the request, whether the request for the element of personal information is appropriate. System 100 may also include a performing module 108 that performs a security action that responds to the request in a manner that is commensurate to the appropriateness of the request for the element of personal information. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 and/or FIG. 4 (e.g., information-managing device 202 in FIG. 2 and/or backend device 402 in FIG. 4), computing system 610 in FIG. 6, and/or portions of example network architecture 700 in FIG. 7. One or more of modules 102 in FIG. 1 may also represent all or portions of one or more special-purpose computers configured to perform one or more tasks.

System 100 in FIG. 1 may be implemented in a variety of ways. For example, all or a portion of system 100 may represent portions of system 200 in FIG. 2. Additionally or alternatively, all or a portion of system 100 may represent portions of system 400 in FIG. 4. As shown in FIG. 2, system 200 may include an information-managing device 202 in communication with a requesting device 206 that is within a proximity 216 of information-managing device 202. In one example, information-managing device 202 may be programmed with one or more of modules 102. Additionally or alternatively, backend device 402 in FIG. 4 may be programmed with one or more of modules 102.

In one embodiment, one or more of modules 102 from FIG. 1 may, when executed by at least one processor of information-managing device 202 and/or backend device 402, enable information-managing device 202 to respond appropriately to requests for personal information. For example, and as will be described in greater detail below, detecting module 104 may detect, at information-managing device 202, a request 210 for information-managing device 202 to provide element of personal information 214 to requesting device 206 that is within physical proximity of information-managing device 202. Evaluating module 106 may evaluate, based at least in part on at least one attribute 212 of request 210, whether request 210 for element of personal information 214 is appropriate. Performing module 108 may then perform a security action 220 that responds to request 210 in a manner that is commensurate to the appropriateness of request 210 for element of personal information 214.

Information-managing device 202 generally represents any type or form of device capable of reading computer-executable instructions and responding to requests for personal information that originate from a requesting device that is within physical proximity to information-managing device 202. In some embodiments, information-managing device 202 may be a handheld, portable, or otherwise carryable device. Furthermore, information-managing device 202 may be a purpose-built device, such as a smart identity badge, or a more generic computing device such as a smartphone. Some forms of information-managing device 202 may be programmed with specialized applications and/or software that allows users to control what information is shared with requesting devices, as will be described in greater detail below. Examples of information-managing device 202 include, without limitation, laptops, tablets, cellular phones, Personal Digital Assistants (PDAs), multimedia players, embedded systems, wearable devices (e.g., smart watches, smart glasses, smart badges, etc.), portable gaming consoles, proximity cards, combinations of one or more of the same, computing system 610 in FIG. 6, or any other suitable computing device. Information-managing device 202 may store personal information 214 and provide personal information 214 to various requesting devices.

Personal information 214 generally represents any type or form of data that describes a user. Personal information 214 may include information about the user's identity, such as the user's birth date, social security number, etc. Additionally or alternatively, personal information 214 may include information about the user's preferences and/or transaction histories, such as information describing the user's musical preferences, Internet browsing history, etc. The systems and methods described herein may mediate which portions of personal information 214 are provided to devices that request information from information-managing device 202.

Requesting device 206 generally represents any type or form of computing device that may request or otherwise receive instances of personal information 214 from information-managing device 202. Examples of requesting device 206 include, without limitation, service kiosks, vending machines, payment processing devices, public terminals, combinations thereof, or any other computing device that provides services based on personal information received from an information-managing device.

Figure 3:
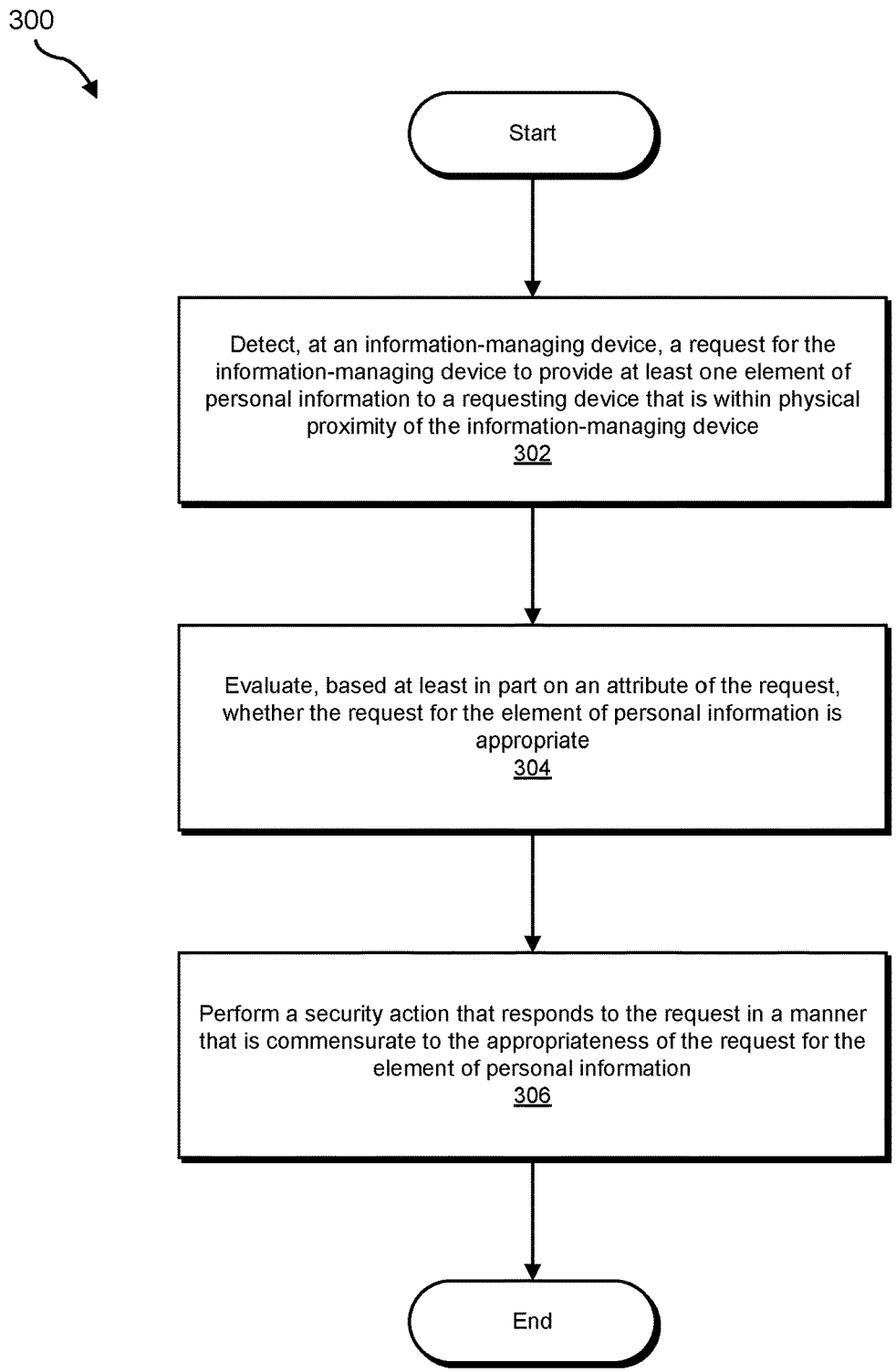
FIG. 3 is a flow diagram of an example method for mediating information requests.

FIG. 3 is a flow diagram of an example computer-implemented method 300 for mediating information requests. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of network architecture 700 in FIG. 7.

As illustrated in FIG. 3, at step 302, one or more of the systems described herein may detect, at information-managing device 202, a request for the information-managing device to provide at least one element of personal information to a requesting device that is within physical proximity of the information-managing device. For example, detecting module 104 may, as part of information-managing device 202 in FIG. 2, detect, at information-managing device 202, a request 210 for information-managing device 202 to provide personal information 214 to a requesting device 206 that is within physical proximity of information-managing device 202.

Detecting module 104 may detect request 210 in a variety of contexts. As described above, information-managing device 202 may take a variety of forms, such as a mobile device, a smart phone, and/or a smart badge. In some embodiments, detecting module 104 may execute as part of a software security application executing on information-managing device 202 that controls communications to and from information-managing device 202. In such embodiments, information-managing device 202 may be a mobile device, smart phone, laptop, or another general-purpose computing device. Additionally or alternatively, detecting module 104 may execute as part of firmware built into information-managing device 202. In these embodiments, information-managing device 202 may be a purpose-built computing device designed to contain and disseminate information about a user when appropriate, such as a smart badge.

Furthermore, detecting module 104 may determine that information-managing device 202 and requesting device 206 are within physical proximity of each other in a variety of ways. In some embodiments, detecting module 104 may determine that information-managing device 202 received request 210 via a short-range wireless communication, such as a nearfield communications system. In such embodiments, it is unlikely that information-managing device 202 and requesting device 206 would be outside the functional range of the nearfield communications protocol. Detecting module 104 may accordingly determine that information-managing device 202 and requesting device 206 are within physical proximity of each other. Additionally or alternatively, information-managing device 202 and requesting device 206 may be connected through a physical cable, such as a Universal Serial Bus (USB) cable or any other suitable cable that facilitates communication between two devices.

In some embodiments, detecting module 104 may receive, from the requesting device, information that identifies the requesting device. For example, requesting device 206 may provide information-managing device 202 with a hardware identifier that uniquely identifies requesting device 206. Other elements of modules 102 may use this identifier information as part of evaluating whether request 210 is appropriate or not, as will be described in greater detail below.

At step 304 in FIG. 3, one or more of the systems described herein may evaluate, based at least in part on at least one attribute of the request, whether the request for the element of personal information is appropriate. For example, evaluating module 106 may, as part of information-managing device 202 in FIG. 2, evaluate, based at least in part on attribute 212 of request 210, whether request 210 for personal information 214 is appropriate.

As will be described in greater detail below, evaluating module 106 may perform a binary evaluation of request 210, i.e., appropriate versus inappropriate. Additionally or alternatively, evaluating module 106 may calculate a probability that request 210 is inappropriate based on an evaluation of one or more factors. Evaluating module 106 may calculate this probability using any appropriate statistical model, including any combination of probabilities derived from evaluating factors alone or in combination.

Evaluating module 106 evaluate a variety of factors when determining whether the request is appropriate. For example, evaluating module 106 may evaluate (i) the time of day when the request was received, (ii) the physical location of the requesting device, (iii) a device type of the requesting device, (iv) a manufacturer of the requesting device, (v) a unique identifier associated with the requesting device, (vi) a reputation score associated with the requesting device, (vii) a third-party verification certificate, included within the request, that digitally verifies the identity of the requesting device by a third party, (viii) at least one characteristic of the element of personal information specified in the request, and/or any other attributes of request 210.

Evaluating module 106 may analyze the above-described factors alone or in combination. For example, evaluating module 106 may evaluate a reputation score associated with the requesting device in combination with a third-party verification certificate that verifies the identity of the requesting device. The combination of these factors may allow evaluating module 106 to determine that the requesting device is an authentic requesting device with a good reputation, and that the request is therefore likely to be appropriate. As an additional example, evaluating module 106 may evaluate the physical location of the requesting device in combination with characteristics of the requested element of personal information. As a specific example, requesting device 206 may be physically present in a children's museum but issue a request for credit card information in order to complete a DVD rental transaction. Evaluating module 106 may use heuristics that declare this situation to be unlikely (DVD rental kiosks are unlikely to be present in museums), and evaluating module 106 may accordingly determine that the request is unlikely to be appropriate.

Information-managing device 202 may calculate, receive, or otherwise establish a reputation score for requesting device 206. In one embodiment, the reputation score may be calculated based on prior requests issued by the requesting device and/or prior requests issued by other requesting devices. For example, information-managing device may determine whether request 210 is similar to previous requests from requesting device 206 and/or similar requesting devices. If request 210 is not similar to these previous requests, evaluating module 106 may determine that request 210 is likely to be inappropriate.

The reputation score may be calculated in a variety of contexts. In some embodiments, the reputation score may be calculated by the information-managing device. For example, information-managing device 202 may track requests from a particular requesting device over a period of time along with an estimated appropriateness of those requests. Information-managing device 202 may assign a positive reputation score to requesting devices that consistently issue appropriate requests, while assigning negative reputation scores to requesting devices that consistently issue inappropriate requests. In some examples, information-managing device 202 may calculate the reputation score of a requesting device based on heuristics and/or other mathematical models provided by a third-party security vendor, as will be described in greater detail below.

Additionally or alternatively, evaluating module 106 may use a reputation score calculated by a third-party security vendor as part of evaluating the appropriateness of request 210. Such a security vendor may collect aggregate data about requesting devices from a large number of information-managing devices that are configured with software that reports information to the security vendor. In such embodiments, the third-party security vendor may provide various information-managing devices with lists of reputation scores and/or heuristics that information-managing devices may use to calculate reputation scores. The security vendor may periodically publish updated reputation information, and provide this information to information-managing device 202 either directly or indirectly over a network.

Figure 4:
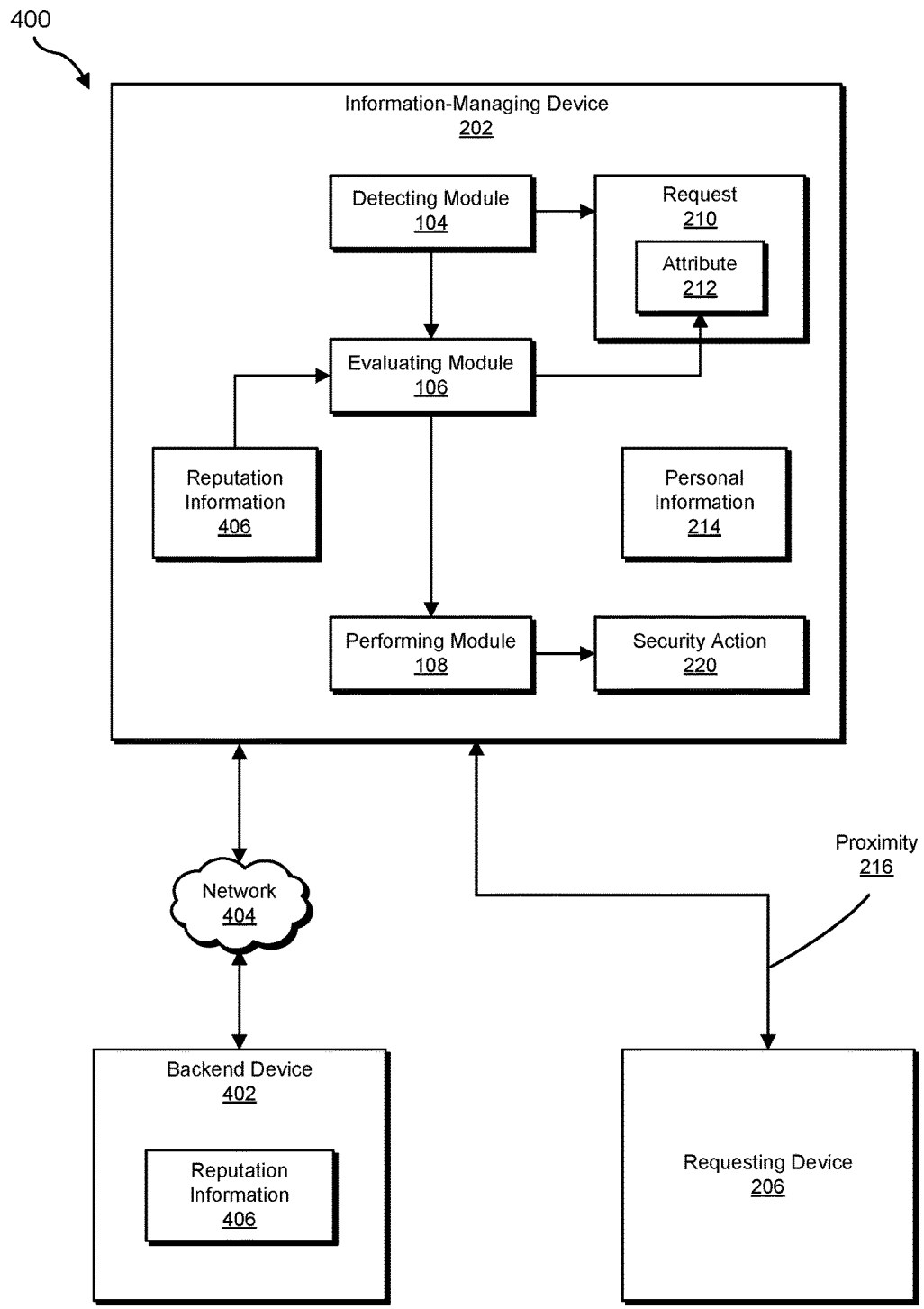
FIG. 4 is a block diagram of an example computing system for mediating information requests.

An illustration of a system involving a third party security vendor is provided in FIG. 4. As shown in FIG. 4, information-managing device 202 may be within proximity 216 of requesting device 206. In this example, a backend device 402 may provide information-managing device 202 with reputation information 406.

Reputation information 406 generally represents any type or form of information that enables evaluating module 106 to determine whether request 210 is appropriate or not. Reputation information 406 may describe a reputation score for requesting device 206 and/or heuristics that evaluating module 106 may use as part of evaluating the appropriateness of request 210.

Backend device 402 generally represents any type or form of computing device that is capable of analyzing data received from multiple information-managing devices to produce reputation information that summarizes what sorts of requests are likely to be appropriate and/or inappropriate. Backend device 402 may be a single computing system or a cluster of cooperating computing systems, and may maintain some or all of the received request information in a database. Examples of backend device 402 include, without limitation, application servers and database servers configured to provide various database services and/or run certain software applications. Backend device 402 may provide reputation information 406 to information-managing device 202 via network 404.

Network 404 generally represents any medium or architecture capable of facilitating communication or data transfer. Examples of network 404 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), network architecture 700 in FIG. 7, or the like. Network 404 may facilitate communication or data transfer using wireless or wired connections. In one embodiment, network 404 may facilitate communication between information-managing device 202 and backend device 402. Additionally or alternatively, network 404 may facilitate communications between backend device 402 and a computing device such as a personal computer (not illustrated) that synchronizes information with information-managing device 202.

Information-managing device 202 may receive reputation information 406 from backend device 402 in a variety of contexts. In some examples, information-managing device 202 may receive reputation information 406 over a cellular network. Additionally or alternatively, a user may configure information-managing device 202 to synchronize data with a computing device, such as a personal computer. This computing device may receive reputation information 406 from backend device 402, and then provide reputation information 406 to information-managing device 202 as part of a synchronization function.

In some embodiments, evaluating module 106 may evaluate attribute 212 in view of privacy settings established by a user. For example, evaluating module 106 may evaluate whether the request for the element of personal information is appropriate by determining whether the request exceeds user-privacy preferences specified by a user of the information-managing device. In other words, the user may configure the circumstances under which information-managing device 202 provides information to requesting devices. As a specific example, a user may configure their device to refrain from sharing identity information (e.g., credit card numbers) with requesting devices that do not satisfy a reputation threshold. Similarly, a user may configure their device to share certain preference information with requesting devices, even if those requesting devices fail to satisfy the reputation threshold.

Additionally or alternatively, a user may designate certain elements of personal information 214 as higher or lower sensitivity. As a specific example, the user may indicate that their personal preference information is low-sensitivity data and configure their device to freely share this low-sensitivity information with requesting devices regardless of the reputation of the requesting device. Conversely, the user may designate information such as their social security number and/or credit card information as higher sensitivity and subject requests for those elements of information to increased scrutiny.

In some examples, evaluating module 106 may evaluate whether the request for the element of personal information is appropriate by determining whether the requesting device is listed on a whitelist that identifies approved requesting devices and/or a blacklist that identifies disapproved requesting devices. A requesting device may be present on a whitelist and/or blacklist for a variety of reasons. In some examples, a user of information-managing device 202 may whitelist and/or blacklist specific requesting devices. For example, a parent may configure an information-managing device belonging to their child to blacklist cigarette vending machines, thus causing the information-managing device to never provide any personal information to cigarette vending machines. Additionally or alternatively, a security vendor may provide the information-managing device with a list of service kiosk identifiers, such as hardware IDs of known airport check-in terminals, thus causing the information-managing device to provide elements of personal information to those requesting devices. In further embodiments, information-managing device 202 may automatically respond to requesting devices represented on a whitelist and require user confirmation before providing personal information to requesting devices that are not represented on the whitelist.

Although the examples described above illustrate blacklists and whitelists as all-or-nothing scenarios, information-managing device 202 may maintain variants of blacklists and whitelists that allow information-managing device 202 to provide certain requesting devices with certain elements of personal information but not others. For example, a user may whitelist certain requesting devices to receive certain kinds of personal information but not others. As a specific example, a user may configure their information-managing device to automatically provide information describing their musical preferences to in-flight entertainment systems while subjecting requests for other elements of personal information, such as billing information, to standard levels of scrutiny.

Returning to FIG. 3 at step 306, one or more of the systems described herein may perform a security action that responds to the request in a manner commensurate to the appropriateness of the request for the element of personal information. For example, performing module 108 may, as part of information-managing device 202 in FIG. 2, perform security action 220 that responds to request 210 in a manner that is commensurate to the appropriateness of request 210 for personal information 214.

Performing module 108 may perform the security action in a manner that is commensurate to the appropriateness of the request for the element of personal information in a variety of ways. For example, performing module 108 may, in response to determining that at least a portion of the request is inappropriate, prevent the information-managing device from providing the element of personal information to the requesting device. Additionally or alternatively, performing module 108 may, in response to determining that at least a portion of the request is appropriate, provide the element of personal information to the requesting device.

Figure 5:
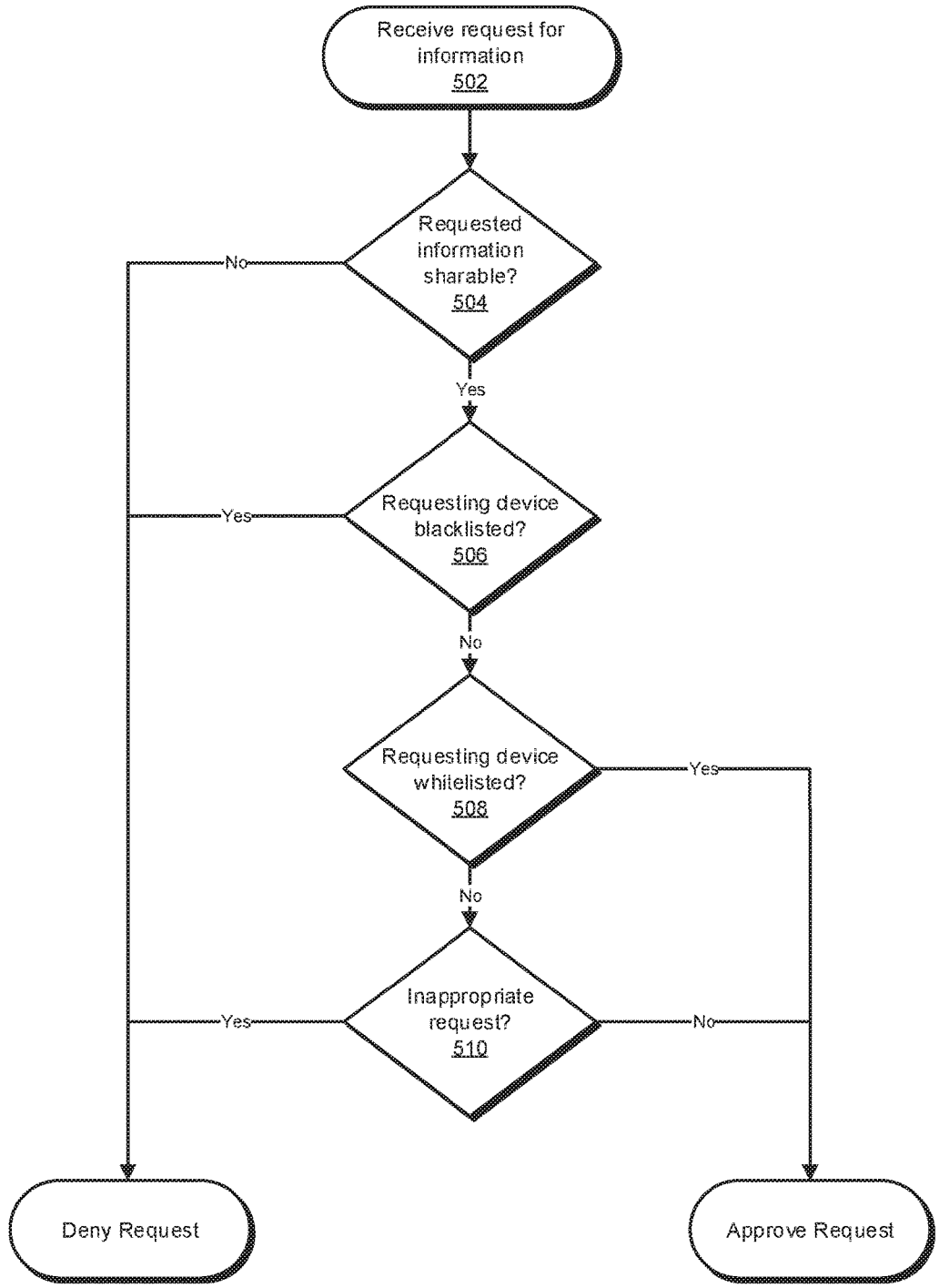
FIG. 5 is a flow diagram of an example decision tree for mediating information requests.

Performing module 108 may enact a variety of steps as part of determining whether to provide the element of personal information to the requesting device. In some examples, performing module 108 may simply approve request 210 or deny request 210 based on the appropriateness of request 210 as evaluated by evaluating module 106. A sample decision tree is illustrated in FIG. 5. As shown in FIG. 5, the systems described herein may, at step 502, receive a request for information from requesting device 206. At step 504, performing module 108 may assess whether or not information-managing device 202 has been configured to share the requested element of personal information. If information-managing device 202 has been configured to not share the element of personal information, performing module 108 may perform a security action that includes denying request 210. If information-managing device 202 has been configured to share the requested element of personal information, performing module 108 may, at step 506 in FIG. 5, determine whether requesting device 206 is represented on a blacklist. If requesting device 206 is blacklisted, performing module 108 may perform a security action that includes denying request 210. If requesting device 206 is not blacklisted, performing module 108 may, at step 508, check if requesting device 206 is whitelisted. If requesting device 206 is whitelisted, performing module 108 may perform a security action that includes approving request 210 and providing the requested personal information to requesting device 206. Otherwise, performing module 108 may, at step 510, determine, based on an evaluation by evaluating module 106, whether request 210 is appropriate. Performing module 108 may perform a security action denying request 210 if evaluating module 106 determines that request 210 is inappropriate, or perform a security action approving request 210 if evaluating module 106 determines that request 210 is in fact appropriate. Naturally, the example provided in FIG. 5 is merely an example. Performing module 108 may use any appropriate arrangement and/or combination of steps, logic, and/or calculations to determine whether approve or deny request 210. In some embodiments, performing module 108 may provide partial approval or partial rejections of request 210, as will be described in greater detail below.

In some examples, performing module 108 may prevent the information-managing device from providing the element of personal information by providing a partial response to the requesting device. For example, a requesting device may request several different elements of personal information. Evaluating module 106 may determine that some portions of this request are appropriate while other portions are inappropriate, and performing module 108 may respond accordingly.

As a specific example of the above-described scenario, an incorrectly configured DVD vending machine may broadcast a valid third-party certificate that authenticates the vending machine, but then issue a request for a user's credit card information and social security number. Evaluating module 106 may determine that DVD vending machines do not typically request social security numbers, and may direct performing module 108 to prevent information-managing device 202 from providing the user's social security number to the vending machine. However, because the vending machine broadcast a valid certificate and issued an expected request for the user's credit card information, evaluating module 106 may determine that the request for the credit card information is appropriate and accordingly direct performing module 108 to perform a security action that includes providing the credit card information to the vending machine.

Furthermore, performing module 108 may tailor security action 220 based on a degree of appropriateness of the request as determined by evaluating module 106. For example, evaluating module 108 may classify a request as "unquestionably appropriate," causing performing module 108 to simply provide the requested personal information to requesting device 206. Alternatively, evaluating module 108 may classify a request as "mostly appropriate." In this situation, performing module 108 may prompt a user for authorization to proceed before providing the requested personal information to requesting device 206. Performing module 108 may additionally or alternatively tailor security action 220 to include any of a number of functions. For example and as described above, performing module 108 may allow or prevent information-managing device 202 from providing personal information 213 to requesting device 206. Additionally or alternatively, performing security action 220 may include notifying a user of the information-managing device of the request (such as through a pop-up notification), providing a security vendor with a report that contains details about the request, and/or generating a log entry that describes the request.

Information-managing devices may, as described in greater detail above, generally be handheld items that may be loaned, lost, stolen, or otherwise end up in the hands of someone other than the primary user. The systems and methods described herein may accordingly protect the user's personal information by verifying the user's identity before providing personal information 214 to requesting device 206. By verifying the user's identity, one or more of modules 102 may prevent information-managing device 202 from engaging in unauthorized transactions. In one embodiment, systems described herein may include, prior to responding to the request, providing a user of the information-managing device with a security challenge that verifies the identity of the user. This security challenge may take place at any point during the evaluation process. For example, and with reference to FIG. 5, the systems and methods described herein may present the security challenge immediately after receiving the request for the personal information. Alternatively, the systems and methods described herein may present the security challenge only after determining that the request would otherwise be approved. Information-managing device may present a variety of security challenges, such as requesting the user's fingerprint, requiring that the user respond correctly to one or more security questions, entering a two-factor-authentication code, entering in a particular set of account credentials, and/or any other suitable security challenge.

Furthermore, information-managing device 202 may be configured to manage personal information from more than one user. Information-managing device 202 may use one or more of the aforementioned security questions as part of determining which user's personal information should be provided to requesting device 206.

As described in greater detail above, the disclosed systems and methods may enable users to fine-tune what elements of personal information they share with various automated service devices such as vending machines, kiosks, entertainment systems, etc. by analyzing incoming requests for personal information and responding in a fashion commensurate to the appropriateness of the request.

Figure 6:
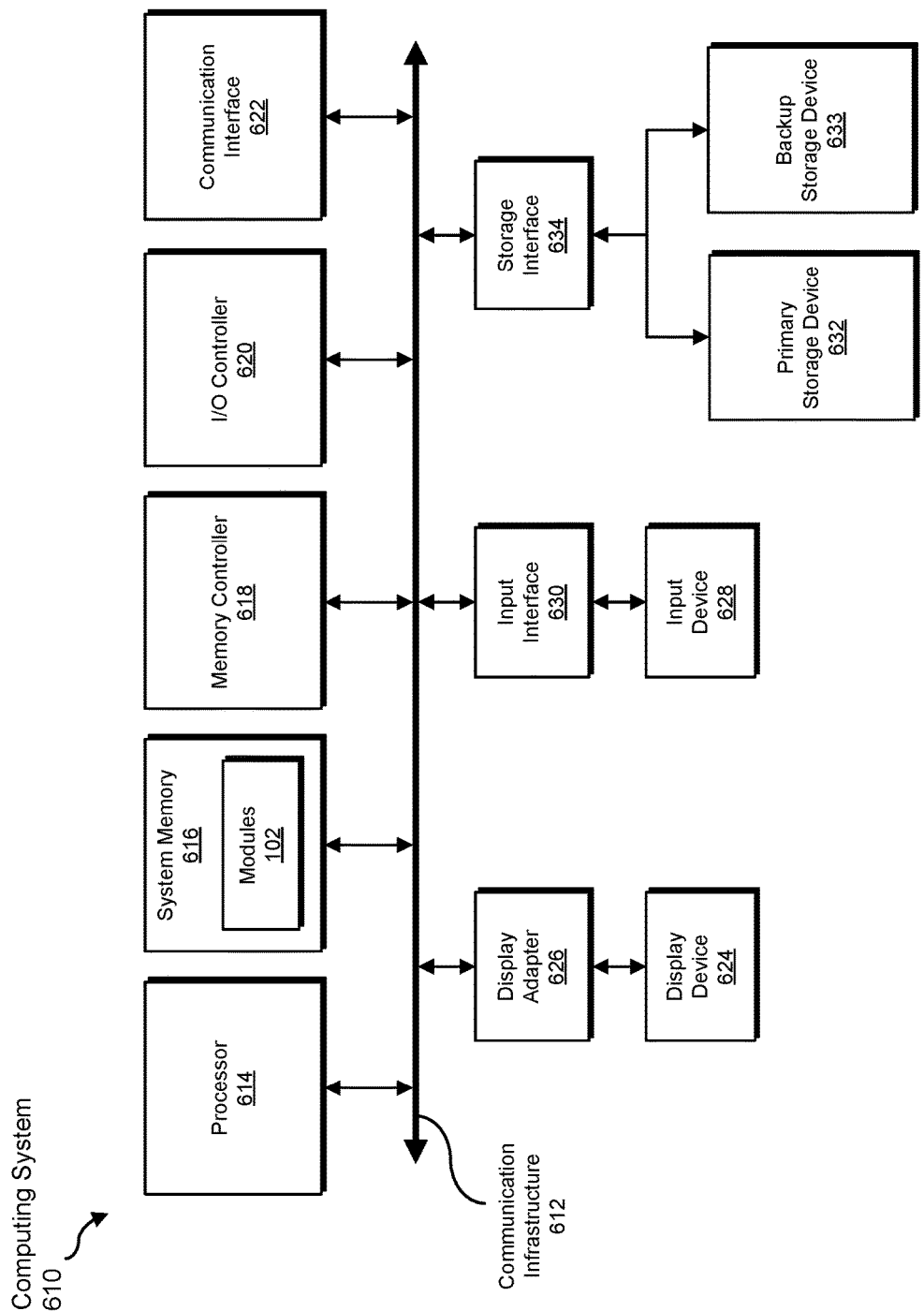
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, computing system 610 may also include at least one input device 628 coupled to communication infrastructure 612 via an input interface 630. Input device 628 generally represents any type or form of input device capable of providing input, either computer or human generated, to computing system 610. Examples of input device 628 include, without limitation, a keyboard, a pointing device, a speech recognition device, or any other input device.

As illustrated in FIG. 6, computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the embodiments described and/or illustrated herein. Additionally or alternatively, one or more of the embodiments described and/or illustrated herein may be implemented in firmware and/or hardware. For example, computing system 610 may be configured as an Application Specific Integrated Circuit (ASIC) adapted to implement one or more of the embodiments disclosed herein.

Figure 7:
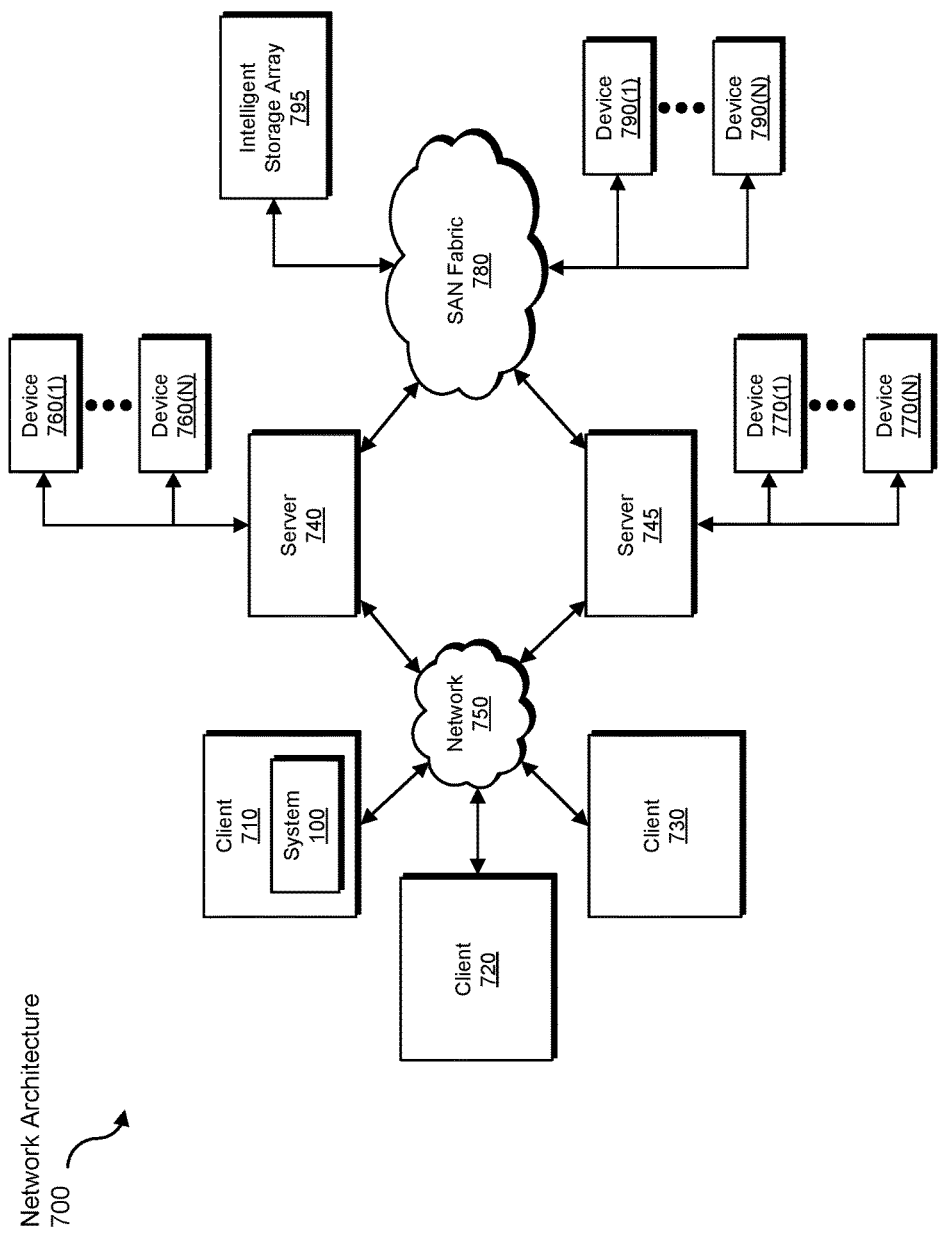
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for mediating information requests.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various methods described and/or illustrated herein may also omit one or more of the steps described or illustrated herein or include additional steps in addition to those disclosed.

While various embodiments have been described and/or illustrated herein in the context of fully functional computing systems, one or more of these embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the embodiments disclosed herein.

In addition, one or more of the modules described herein may transform data, physical devices, and/or representations of physical devices from one form to another. For example, one or more of the modules recited herein may receive a request for personal information, use information contained in the request to calculate a level of appropriateness of the request, use a result of the calculation to determine whether to approve the request, report a summary of the request to a security vendor, store a result of the calculation in a database, and/or notify a user of the request. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the embodiments disclosed herein. This description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for mediating information requests, at least a portion of the method being performed by an information-managing device comprising at least one processor, the method comprising:
    detecting, at the information-managing device, a request for the information-managing device to provide a plurality of elements of personal information to a requesting device that is within physical proximity of the information-managing device;
    identifying at least one attribute of the request that describes a context in which the information-managing device detected the request, wherein the at least one attribute comprises a device type of the requesting device;

evaluating each requested element of personal information in the plurality of elements of personal information, based at least in part on determining whether the requested element of personal information matches the context in which the information-managing device detected the request, for whether the request for the requested element of personal information is an appropriate request for the requested element of personal information; and preventing the information-managing device from providing elements of personal information to requesting devices that requested the elements of personal information in an inappropriate context by performing, at the information-managing device, a security action that responds to the request in a manner that is commensurate to the appropriateness of the request for the element of personal information wherein the security action comprises:

in response to determining that a first portion of the request represents an inappropriate request for a first element of personal information in the plurality of elements of personal information, preventing the information-managing device at least from providing the first element of personal information to the requesting device; and in response to determining that an additional portion of the request represents an appropriate request for an additional element of personal information in the plurality of elements of personal information, providing the additional element of personal information to the requesting device.

2. The method of claim 1, wherein preventing the information-managing device from providing the element of personal information comprises providing a partial response to the requesting device.

3. The method of claim 1, wherein the security action further comprises at least one of:
notifying a user of the information-managing device of the request;
providing a security vendor with a report that contains details about the request; and
generating a log entry that describes the request.

4. The method of claim 1, wherein evaluating whether the request for the plurality of elements of personal information is appropriate comprises determining whether the request exceeds user-privacy preferences specified by a user of the information-managing device.

5. The method of claim 1, wherein evaluating whether the request for the plurality of elements of personal information is appropriate comprises determining whether the requesting device is listed on:
a whitelist that identifies approved requesting devices; or
a blacklist that identifies disapproved requesting devices.

6. The method of claim 1, wherein the attribute of the request further comprises at least one of:
a time of day when the request was received;
the physical location of the requesting device;
a manufacturer of the requesting device;
a unique identifier associated with the requesting device;
a reputation score associated with the requesting device;
a third-party verification certificate, included within the request, that digitally verifies the identity of the requesting device by a third party; and
at least one characteristic of the element of personal information specified in the request.

7. The method of claim 6, wherein the reputation score is calculated based on at least one of:
prior requests issued by the requesting device; and
prior requests issued by other requesting devices.

8. The method of claim 6, wherein the reputation score is calculated by at least one of:
a third-party security vendor; and
the information-managing device.

9. The method of claim 1, further comprising, prior to responding to the request, providing a user of the information-managing device with a security challenge that verifies the identity of the user.

10. The method of claim 1, wherein the information-managing device comprises at least one of:
a mobile device;
a smart phone; and
a smart badge.

11. A system for mediating information requests, the system comprising:
a detecting module, stored in memory, that detects, at an information-managing device, a request for the information-managing device to provide a plurality of elements of personal information to a requesting device that is within physical proximity of the information-managing device;
an evaluating module, stored in memory, that:
identifies at least one attribute of the request that describes a context in which the information-managing device detected the request, wherein the at least one attribute comprises a device type of the requesting device; and
evaluates each requested element of personal information in the plurality of elements of personal information, based at least in part on determining whether the requested element of personal information matches the context in which the information-managing device detected the request, for whether the request for the requested element of personal information is an appropriate request for the requested element of personal information;
a performing module, stored in memory, that prevents the information-managing device from providing elements of personal information to requesting devices that requested the elements of personal information in an inappropriate context by performing, at the information-managing device, a security action that responds to the request in a manner that is commensurate to the appropriateness of the request for the element of personal information, wherein the security action comprises:
in response to determining that a first portion of the request represents an inappropriate request for a first element of personal information in the plurality of elements of personal information, preventing the information-managing device at least from providing the first element of personal information to the requesting device; and
in response to determining that an additional portion of the request represents an appropriate request for an additional element of personal information in the plurality of elements of personal information, providing the additional element of personal information to the requesting device; and at least one physical processor configured to execute the detecting module, the evaluating module, and the performing module.

12. The system of claim 11, wherein the performing module prevents the information-managing device from providing the element of personal information by providing a partial response to the requesting device.

13. The system of claim 11, wherein the security action further comprises at least one of:
   notifying a user of the information-managing device of the request;
   providing a security vendor with a report that contains details about the request; and
   generating a log entry that describes the request.

14. The system of claim 11, wherein the evaluating module evaluates whether the request for the plurality of elements of personal information is appropriate by determining whether the request exceeds user-privacy preferences specified by a user of the information-managing device.

15. The system of claim 11, wherein the evaluating module evaluates whether the request for the plurality of elements of personal information is appropriate by determining whether the requesting device is listed on:
   a whitelist that identifies approved requesting devices; or
   a blacklist that identifies disapproved requesting devices.

16. The system of claim 11, wherein the attribute of the request further comprises at least one of:
   a time of day when the request was received;
   the physical location of the requesting device;
   a manufacturer of the requesting device;
   a unique identifier associated with the requesting device;
   a reputation score associated with the requesting device;
   a third-party verification certificate, included within the request, that digitally verifies the identity of the requesting device by a third party; and
   at least one characteristic of the element of personal information specified in the request.

17. The system of claim 16, wherein the reputation score is calculated based on at least one of:
   prior requests issued by the requesting device; and
   prior requests issued by other requesting devices.

18. A non-transitory computer-readable medium comprising one or more computer-readable instructions that, when executed by at least one processor of a computing device, cause the computing device to:
   detect, at the information-managing device, a request for the information-managing device to provide a plurality of elements of personal information to a requesting device that is within physical proximity of the information-managing device;
   identify at least one attribute of the request that describes a context in which the information-managing device detected the request, wherein the at least one attribute comprises a device type of the requesting device;
   evaluate each requested element of personal information in the plurality of elements of personal information, based at least in part on determining whether the requested element of personal information matches the context in which the information-managing device detected the request, for whether the request for the requested element of personal information is an appropriate request for the requested element of personal information; and
   prevent the information-managing device from providing elements of personal information to requesting devices that requested the elements of personal information in an inappropriate context by performing, at the information-managing device, a security action that responds to the request in a manner that is commensurate to the appropriateness of the request for the element of personal information, wherein the security action comprises:
   in response to determining that a first portion of the request represents an inappropriate request for a first element of personal information in the plurality of elements of personal information, preventing the information-managing device at least from providing the first element of personal information to the requesting device; and
   in response to determining that an additional portion of the request represents an appropriate request for an additional element of personal information in the plurality of elements of personal information, providing the additional element of personal information to the requesting device.

* * * * *